(12) United States Patent
Kang et al.

(10) Patent No.: US 8,627,804 B2
(45) Date of Patent: Jan. 14, 2014

(54) TRANSIENT CONTROL STRATEGY IN SPARK-ASSISTED HCCI COMBUSTION MODE

(75) Inventors: Jun-Mo Kang, Ann Arbor, MI (US); Hanho Yun, Oakland Township, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 509 days.

(21) Appl. No.: 12/946,916

(22) Filed: Nov. 16, 2010

(65) Prior Publication Data

US 2012/0118275 A1  May 17, 2012

(51) Int. Cl.
*F02B 47/08* (2006.01)
(52) U.S. Cl.
USPC .................. 123/568.11; 123/406.44
(58) Field of Classification Search
USPC ............. 123/406.26, 406.44, 406.48, 568.18, 123/568.21, 672, 679; 701/103, 105
See application file for complete search history.

(56) References Cited

U.S. PATENT DOCUMENTS

| | | | | |
|---|---|---|---|---|
| 5,383,126 A * | 1/1995 | Ogawa et al. | ................. | 701/108 |
| 5,482,020 A * | 1/1996 | Shimizu et al. | .......... | 123/406.47 |
| 5,537,977 A * | 7/1996 | Hartman et al. | ......... | 123/406.46 |
| 6,609,493 B2 * | 8/2003 | Yamaguchi et al. | .......... | 123/299 |
| 6,994,072 B2 | 2/2006 | Kuo et al. | | |
| 7,128,047 B2 | 10/2006 | Kuo et al. | | |
| 7,137,382 B2 * | 11/2006 | Zhu et al. | ...................... | 123/435 |
| 8,352,162 B2 * | 1/2013 | Leone et al. | .................. | 701/108 |

OTHER PUBLICATIONS

U.S. Appl. No. 12/395,747, Kang et al.

* cited by examiner

*Primary Examiner* — Stephen K Cronin
*Assistant Examiner* — Elizabeth Hadley

(57) ABSTRACT

A method for controlling a multi-cylinder direct-injection internal combustion engine includes establishing an external exhaust gas recirculation valve from a present position to a target position to achieve a target exhaust gas recirculation, and synchronizing combustion initiation timing with actual exhaust gas recirculation as actual exhaust gas recirculation changes from a first exhaust gas recirculation value corresponding to the present position of the external exhaust gas recirculation valve to a second exhaust gas recirculation value corresponding to the target position of the external exhaust gas recirculation valve.

16 Claims, 4 Drawing Sheets

TRANSIENT CONTROL STRATEGY IN SPARK-ASSISTED HCCI COMBUSTION MODE

TECHNICAL FIELD

This disclosure relates to operation and control of homogeneous-charge compression-ignition (HCCI) engines.

BACKGROUND

The statements in this section merely provide background information related to the present disclosure and may not constitute prior art.

Internal combustion engines, especially automotive internal combustion engines, generally fall into one of two categories: spark ignition and compression ignition. Spark ignition engines, such as gasoline engines, introduce a fuel/air mixture into the combustion cylinders, which is then compressed in the compression stroke and ignited by a spark plug. Compression ignition engines, such as diesel engines, introduce or inject pressurized fuel into a combustion cylinder near top dead center (TDC) of the compression stroke, which ignites upon injection. Combustion for both gasoline engines and diesel engines involves premixed or diffusion flames that are controlled by fluid mechanics. Each type of engine has advantages and disadvantages. In general, gasoline engines produce fewer emissions but are less efficient. In general, diesel engines are more efficient but produce more emissions.

More recently, other types of combustion methodologies have been introduced for internal combustion engines. One of these combustion concepts is known in the art as the homogeneous charge compression ignition (HCCI). The HCCI combustion mode includes a distributed, flameless, auto-ignition combustion process that is controlled by oxidation chemistry, rather than by fluid mechanics. In a typical engine operating in HCCI combustion mode, the cylinder charge is nearly homogeneous in composition and temperature at intake valve closing time. The typical engine operating in the HCCI combustion mode can further operate using stratified charge fuel injection to control and modify the combustion process, including using stratified charge combustion to trigger the HCCI combustion. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low nitrous oxides (NOx) emissions. The fuel/air mixture for auto-ignition is relatively homogeneous, as compared to the stratified fuel/air combustion mixtures used in diesel engines. Therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. The HCCI engine can operate at stoichiometry with substantial amounts of exhaust gas recirculation (EGR) to achieve effective combustion.

There is no direct control of start of combustion for an engine operating in the auto-ignition mode, as the chemical kinetics of the cylinder charge determine the start and course of the combustion. Chemical kinetics are sensitive to temperature and, as such, the controlled auto-ignition combustion process is sensitive to temperature. An important variable affecting the combustion initiation and progress is the effective temperature of the cylinder structure, i.e., temperature of cylinder walls, head, valve, and piston crown. Additionally, spark-assisted ignition is known to facilitate combustion in certain operating ranges.

Operation within an HCCI mode at higher loads can be challenging, as energy present within the combustion chamber increases with increasing load. This increasing energy, exhibited for example by higher temperatures within the air fuel charge being combusted, increases likelihood of the air fuel charge combusting before the desired combustion point, resulting in an undesirable pressure wave or ringing from the combustion chamber.

SUMMARY

A method for controlling a multi-cylinder direct-injection internal combustion engine includes establishing an external exhaust gas recirculation valve from a present position to a target position to achieve a target exhaust gas recirculation, and synchronizing combustion initiation timing with actual exhaust gas recirculation as actual exhaust gas recirculation changes from a first exhaust gas recirculation value corresponding to the present position of the external exhaust gas recirculation valve to a second exhaust gas recirculation value corresponding to the target position of the external exhaust gas recirculation valve.

BRIEF DESCRIPTION OF THE DRAWINGS

One or more embodiments will now be described, by way of example, with reference to the accompanying drawings, in which.

DETAILED DESCRIPTION

Figure 1:
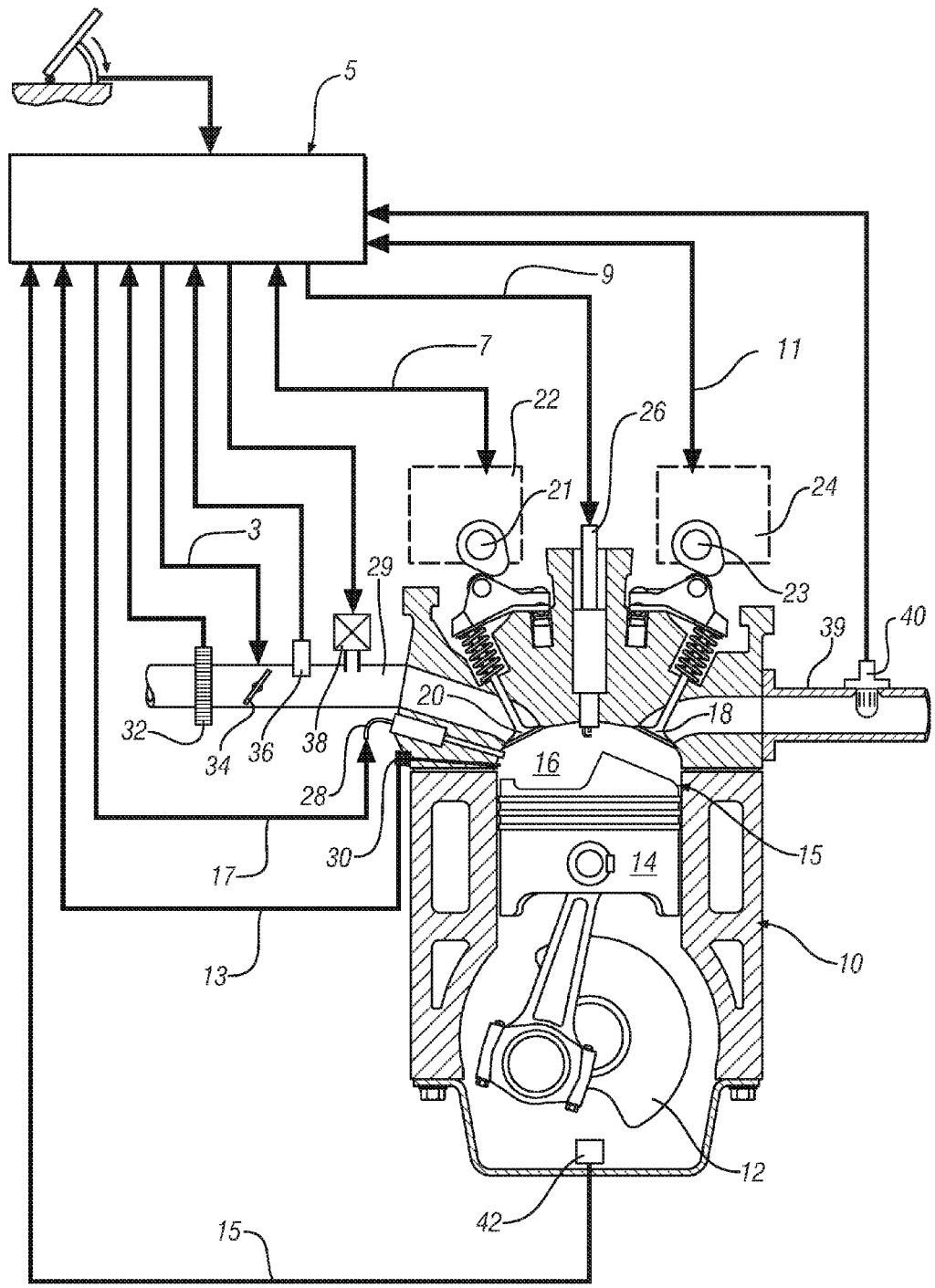
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 schematically shows an exemplary internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode and a homogeneous spark-ignition (SI) combustion mode. The engine 10 is selectively operative at a stoichiometric air/fuel ratio and at an air/fuel ratio that is primarily lean of stoichiometry. It is appreciated that the concepts in the disclosure can be applied to other internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, e.g. an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal,) to determine a torque request (To_req). It will be appreciated that the torque request can be in response to an operator input (e.g., via the accelerator pedal and the brake pedal) or the torque request can be in response to an auto start condition monitored by the control module 5. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position opening to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 16 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean air/fuel ratio. Substantially wide-open throttle can include operating fully un-throttled, or slightly throttled to create a vacuum in the intake manifold 29 to affect EGR flow. In one embodiment, in-cylinder EGR mass is controlled to a high dilution rate. The intake and exhaust valves 20 and 18 are in the low-lift valve position and the intake and exhaust lift timing operate with NVO. One or more fuel injection events can be executed during an engine cycle including at least one fuel injection event during a compression phase.

During engine operation in the homogeneous spark-ignition (SI) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

Figure 2:
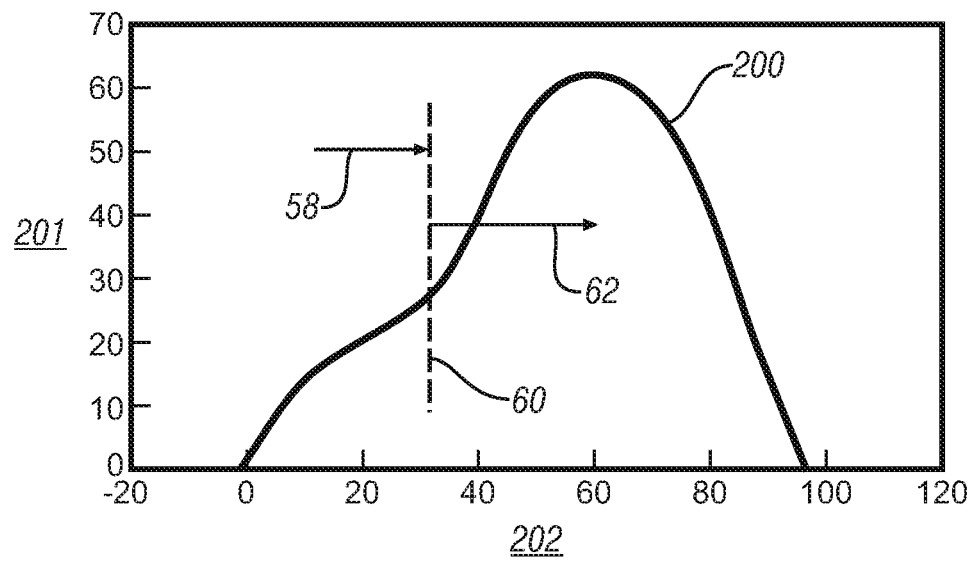
FIG. 2 is a graph depicting a heat release rate profile during spark-assisted HCCI combustion, in accordance with the present disclosure.

Referring to FIG. 2, a graph depicting a heat release rate profile 200 during spark-assisted HCCI (auto-ignition) combustion is illustrated in accordance with the present disclosure. The x-axis 202 represents a Mass Fraction Burn (%) and the y-axis 201 represents the Heat Release Rate (J/deg). The high-load operating limit of controlled auto-ignition (HCCI) can be extended by spark igniting the air fuel charge prior to a auto-ignition point designated by dashed line 60. Igniting the air fuel charge initiates flame propagation, wherein flame propagation is utilized to extend the high-load operating limit by retarding auto-ignition and thus achieving acceptable combustion noise. During high-load operation, the spark-assisted auto-ignition includes delivering the fuel mass to the engine using a single injection during an intake stroke, spark-igniting the injected fuel mass during a compression stroke, initiating flame propagation and auto-igniting the remainder of the injected fuel mass when the temperature of the cylinder charge increases by the flame propagation to a temperature sufficient for auto-ignition. Flame propagation occurs up to the dashed line 60 and is denoted by arrow 58. Auto-ignition occurs at the dashed line 60 and is denoted by arrow 62. As will become apparent, combustion noise and combustion misfires can be substantially reduced during engine load transients while maintaining robust combustion stability by increasing or decreasing the spark timing and/or the injected fuel mass timing (i.e., combustion initiation timing). Specifically, retarding the spark timing and/or the injected fuel mass timing retards combustion phasing and reduces combustion noise. Advancing the spark timing and/or the injected fuel mass timing advances combustion phasing and reduces combustion misfire and partial combustion burn. It is appreciated that the spark-ignited air fuel charge can include an air fuel ratio substantially at stoichiometric to utilize a three-way catalytic converter to meet desirable NOx emission standards.

Embodiments discussed herein utilize a control strategy for maintaining robust combustion during load transients while operating the engine in a controlled auto-ignition (HCCI) mode including spark-assisted ignition during high-load operation. It will be appreciated that the control strategy is not limited to high-load auto-ignition (HCCI) operation and can be similarly applied to low- and medium-load auto-ignition (HCCI) operation with or without spark-assisted ignition.

Load transients can occur in response to an operator torque request and can include rapid load transients in response to a rapid operator torque request. It will be understood that engine load corresponds to injected fuel mass required to achieve the operator torque request. Engine load and injected fuel mass will be used interchangeably herein. The injected fuel mass is increased or decreased to meet an increased or decreased operator torque request, respectively. As aforementioned, operator torque requests are monitored by the control module 5 and can include accelerator pedal and brake pedal inputs. When an engine load transient occurs, the amount of external EGR must be adjusted to achieve a value corresponding to the engine load (i.e., injected fuel mass) to maintain a desired air fuel ratio and acceptable combustion noise. For instance, the desired air fuel ratio can be substantially stoichiometric to meet desired NOx emission levels utilizing a three-way catalytic converter at high engine load. The injected fuel mass corresponding to the engine load transient is a mass sufficient to achieve the operator torque request. The amount of external EGR is adjusted utilizing the control module 5 to control mass flow of exhaust gas to the intake manifold 29 by controlling the opening percentage of the EGR valve 38. Therefore, in response to an injected fuel mass transient (i.e., engine load transient) associated with a transient operator torque request, the external EGR valve 38 percentage opening is adjusted to achieve a value corresponding to the injected fuel mass transient to maintain the desired air fuel ratio (e.g., substantially stoichiometric) and acceptable combustion noise. The amount of external EGR will further be referred to as the external EGR percentage.

Figure 3:
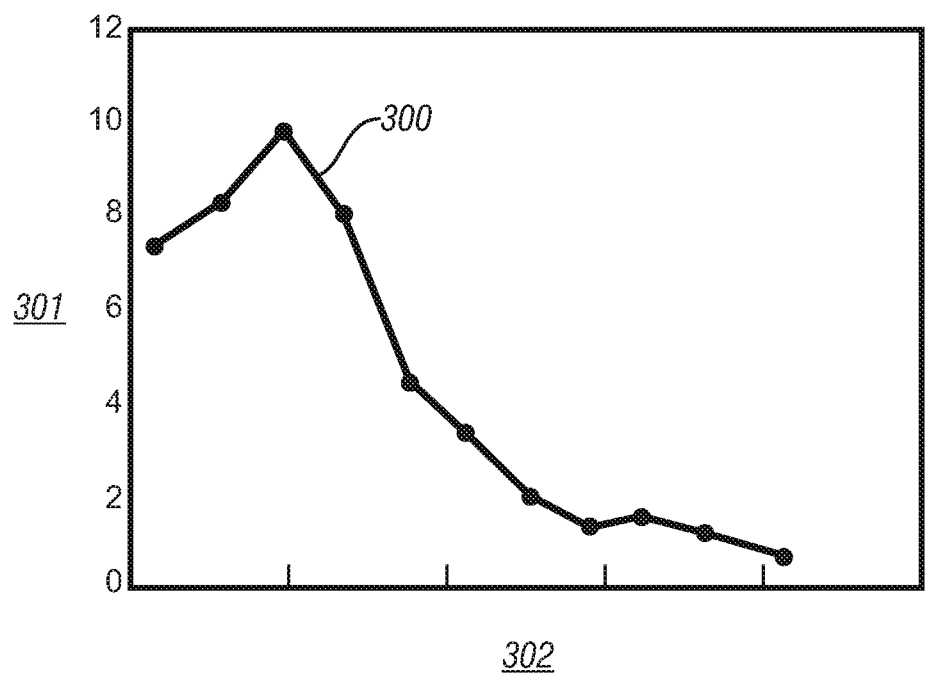
FIG. 3 is a plot of fuel injection mass 302 versus external exhaust gas recirculation (EGR) percentage 301 required to maintain desired stoichiometry for spark-assisted HCCI combustion, in accordance with the present disclosure.

Referring now to FIG. 3, a plot of injected fuel mass versus external EGR percentage required to maintain a desired air fuel ratio (e.g., stoichiometric) and acceptable combustion noise while achieving the best fuel efficiency and emissions for spark-assisted HCCI combustion is illustrated in accordance with the present disclosure. The x-axis 302 represents Fuel Mass (mg/cycle) and the y-axis 301 represents external EGR percentage (%). Line 300 represents the desired external EGR percentage. As demonstrated for fuel exceeding at a specified mass, the external EGR percentage decreases as the fuel mass increases.

The external EGR has relatively slow dynamics (external EGR dynamics) compared to fuel mass injections. In other words, it takes longer to adjust the external EGR percentage than it does to adjust the injected fuel mass. The external EGR dynamics are associated with a rate for the adjusted external EGR percentage to achieve a value corresponding to the injected fuel mass. A difference in the amount of external EGR percentage required for two different injected fuel masses during engine load transients can have a significant impact on the combustion stability during such transients. For instance, if the injected fuel mass was rapidly increased due to an increased operator torque request, the engine would be initially operated with excessive amount of external EGR percentage due to slow emptying dynamics when the external EGR percentage is decreasing until the emptying dynamics achieve the external EGR percentage value corresponding to the increased injected fuel mass. The slow emptying dynamics can retard combustion phasing more than desired resulting in partial combustion burn or combustion misfire. Similarly, if the injected fuel mass was rapidly decreased due to a decreased operator torque request, the engine would be initially operated with an insufficient amount of external EGR percentage due to slow filling dynamics when the external EGR percentage is increasing until the filling dynamics achieve an external EGR percentage value corresponding to the decreased injected fuel mass to maintain the desired air fuel ratio. The slow filling dynamics can advance combustion phasing more than desired resulting in excessive combustion noise.

To compensate for the slow external EGR dynamics, combustion initiation timing is adjusted at a rate according to the external EGR dynamics (e.g., emptying or filling dynamics) to maintain robust combustion and substantially prevent combustion misfires and excessive combustion noise. In other words, the combustion initiation timing is synchronized with the external EGR dynamics (e.g., emptying or filling dynamics) to maintain robust combustion and prevent combustion misfires and excess combustion noise rather than synchronizing the combustion initiation timing with the injected fuel mass transient (i.e., load transient) based on static calibration because the external EGR percentage cannot be adjusted quickly due to slow external EGR dynamics. The combustion initiation timing can include injection timing and spark timing. For instance, if the injected fuel mass was rapidly increased due to an operator torque request and the external EGR percentage is decreased to achieve a value corresponding to the increased injected fuel mass, combustion initiation timing can be decreased at a slow rate to compensate for slow emptying dynamics. Slowly decreasing the combustion initiation timing includes slowly retarding combustion phasing to substantially reduce combustion misfire and combustion partial burns resulting from the initially excessive external EGR percentage. Similarly, if the injected fuel mass was rapidly decreased due to a decreased operator torque request and the external EGR percentage is increased to achieve a value corresponding to the decreased injected fuel mass, combustion initiation timing can be increased at a slow rate to compensate for slow filling dynamics. The slowly increasing combustion initiation timing includes slowly advancing combustion phasing to substantially prevent excessive combustion noise resulting from the initially insufficient external EGR percentage.

As aforementioned, combustion initiation timing can include fuel injection timing and spark timing. It is appreciated that adjusting fuel injection timing and spark timing can compensate for the effects that slow external EGR dynamics have on combustion phasing. Combustion phasing describes the progression of combustion in a cycle as measured by the crank angle of the cycle. One metric to judge combustion phasing is CA50 or the crank angle at which 50% of the air fuel charge is combusted. Properties of a combustion cycle, such as efficiency, are affected by CA50 of the cycle. However, other factors such as injection and spark timing can affect CA50. Injection and spark timing can both be adjusted and synchronized with the external EGR dynamics to compensate for the slow external EGR dynamics, or either one of injection timing or spark timing can be adjusted and synchronized with the external EGR dynamics to compensate for slow external EGR dynamics.

Adjusting injection timing can be utilized to modulate resulting combustion phasing from slow external EGR dynamics. The effect of injection timing upon combustion phasing depends upon the resulting conditions within the combustion chamber. For example, later or decreased injection timing can cause combustion to start later, thereby retarding combustion phasing. Therefore, when engine load is increased associated with an increased operator torque request and the external EGR percentage is decreased to achieve the value corresponding to the increased engine load, decreasing the fuel injection timing at a rate synchronized with the emptying dynamics of the external EGR percentage can compensate for an initially excessive external EGR percentage resulting from slow emptying dynamics until the adjusted external EGR percentage achieves the value corresponding to the increased engine load. In another example, increased or earlier injection can cause combustion to start earlier, thereby advancing combustion phasing. Therefore, when engine load is decreased associated with a decreased operator torque request and the external EGR percentage is increased to achieve the value corresponding to the decreased engine load, increasing the fuel injection timing at a rate synchronized with the filling dynamics of the external EGR percentage can compensate for an initially insufficient external EGR percentage resulting from slow filling dynamics until the adjusted external EGR percentage achieves the value corresponding to the decreased engine load.

Spark timing can also be utilized to modulate resulting combustion phasing resulting from slow external EGR dynamics. Spark-assisted ignition of auto-ignition (HCCI) combustion includes utilizing a spark to create combustion within the combustion chamber of an air fuel charge not yet at an energy level conducive to controlled auto-ignition (HCCI). The spark induced combustion creates a release of energy within the combustion chamber including a pressure wave. This energy release propagates to the remainder of the combustion chamber and facilitates the remainder of the air fuel charge to achieve auto-ignition (HCCI). While auto-ignition most ideally operates without spark ignition, circumstances are known wherein spark-assisted auto-ignition operation is desirable. For example, in cold start or low speed and low load conditions, spark-assisted HCCI utilizes the energy release from the spark ignition to facilitate auto-ignition of the charge in a region wherein auto-ignition might be unstable or not possible. In the present circumstances, to enable HCCI operation at higher loads, spark-assisted ignition can be used to begin combustion of the charge to initiate controlled auto-ignition (HCCI), thereby allowing control of combustion phasing through modulation of the spark timing. Testing has shown that, when such selection is possible according to injection timing, resulting CA50, and other related parameters, selection of advanced spark timing can facilitate combustion of 20% of the air fuel charge in advance of the initiation of auto-ignition. In an example, when the engine load is increased associated with an increased torque request and the external exhaust gas recirculation percentage is decreased to achieve the value corresponding to the increased load, spark timing can be selected to combust a portion of an air fuel charge to initiate auto-ignition timing. The spark timing is decreased at a rate synchronized with the emptying dynamics of the external EGR percentage to compensate for an initially excessive external EGR percentage resulting from slow emptying dynamics until the adjusted external EGR percentage achieves the value corresponding to the increased load. In another example, when the engine load is decreased corresponding to a decreased torque request and the external exhaust gas recirculation percentage is increased to achieve the value corresponding to the decreased engine load, spark timing can be selected to combust a portion of an air fuel charge to initiate auto-ignition timing. The spark timing is increased at a rate synchronized with the filling dynamics to compensate for an initially insufficient external EGR percentage resulting from slow filling dynamics until the adjusted external EGR percentage achieves the value corresponding to the decreased engine load.

Figure 4:
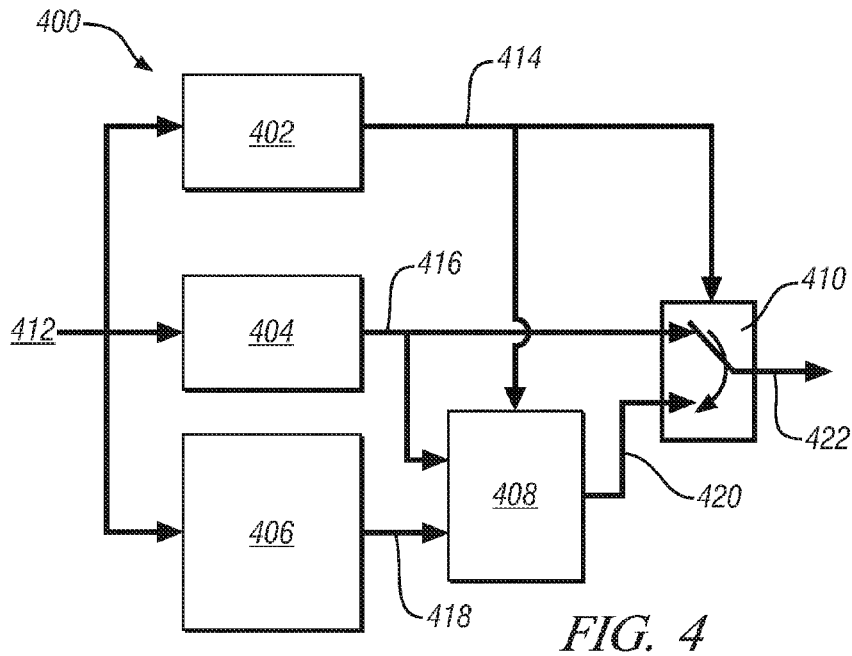
FIG. 4 schematically illustrates an external EGR compensation controller 400 for adjusting fuel injection and/or spark timing to be synchronized with emptying and filling of external EGR during load transients in spark-assisted HCCI combustion mode, in accordance with the present disclosure.

Referring now to FIG. 4, a compensation controller 400 for adjusting combustion initiation timing to be synchronized with external EGR dynamics (e.g., filling/emptying dynamics) during engine load transients in spark-assisted HCCI (auto-ignition) combustion mode is illustrated in accordance with the present disclosure. The compensation controller includes a combustion mode determination module 402, a calibration table module 404, a time constant determination module 406, a low pass filter module 408 and a combustion initiation timing switch module 410. A desired load transient 412 and associated desired engine speed is input to the combustion mode determination module 402, the calibration table module 404 and the time constant determination module 406. The desired load transient is based upon, for example, the operator torque request, wherein the operator torque request can include operator inputs to actuators including an accelerator pedal and a brake pedal, as mentioned above. It is further appreciated that the compensation controller 400 is associated with the control module 5. If the combustion mode determination module 402 determines spark-assisted auto-ignition mode based upon the desired load transient 412 and associated engine speed, a signal 414 indicating spark-assisted auto-ignition mode is input to the switch module 410 and the low-pass filter module 408. The calibration table 404 inputs a signal 416 indicating static calibration of the combustion initiation timing into the low-pass filter module 408 and the switch module 410, wherein the signal 416 is based on the desired load transient 412 and associated engine speed. The time constant determination module 406 generates a time constant signal 418 based on the desired load transient 412 and associated engine speed, wherein the time constant signal 418 is input to the low-pass filter module 408. The low pass filter module 408 generates a filtered signal 420 that is input to the switch module 410. The filtered signal 420 is based on the time constant signal 418 and the signal 416 indicating static calibration of the combustion initiation timing. The switching module 410 determines the adjusted combustion initiation timing 422 synchronized with external EGR dynamics to thereby compensate for slow external EGR dynamics during load transients. The adjusted combustion initiation timing 422 includes fuel injection timing and spark timing and is based upon the signal 414 indicating spark-assisted auto-ignition mode, the signal 416 indicating static calibration of the combustion initiation timing and the time constant signal 418.

Figure 5:
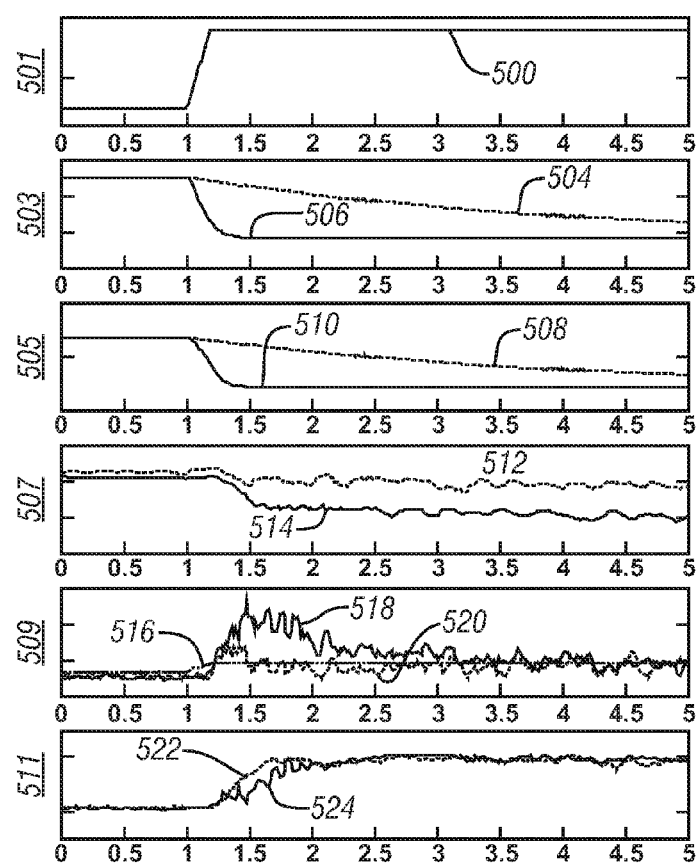
FIG. 5 graphically depicts experimental and derived data from an exemplary engine, depicting fuel injected mass 501, fuel injection timing 503, spark ignition timing 505, EGR valve opening 507, CA50 (i.e., crank angle location of 50% fuel mass burn) 509 and average IMEP 511 versus time 502, in accordance with the present disclosure.

Referring now to FIG. 5, experimental and derived data from an exemplary engine are illustrated, depicting injected fuel mass 501, fuel injection timing 503 (before TDC), spark ignition timing 505 (before TDC), EGR valve opening 507, CA50 (i.e., crank angle location of 50% fuel mass burn) 509, and average IMEP 511 versus time 502 in accordance with the present disclosure. In each of the data plots 503, 505, 507, 509 and 511, the dashed profile lines include adjustments to compensate for slow external EGR dynamics, whereas the solid profile lines do not include adjustments to compensate for slow external EGR dynamics. When an injected fuel mass is increased 500, compensated fuel injection timing 504 is plotted against fuel injection timing 506 without compensation; compensated spark ignition timing 508 is plotted against spark ignition timing 510 without compensation; EGR valve opening 512 with compensation is plotted against EGR valve opening 514 without compensation which is adjusted in real-time to maintain a desired CA 50 profile 516; and compensated IMEP 522 is plotted against IMEP 524 without compensation. It is appreciated that compensated CA 50 profile 520 maintains the desired CA 50 profile 516 when compensation for slow external EGR emptying dynamics is utilized, as opposed to CA 50 profile 518 without compensating for the external EGR emptying dynamics.

Figure 6:
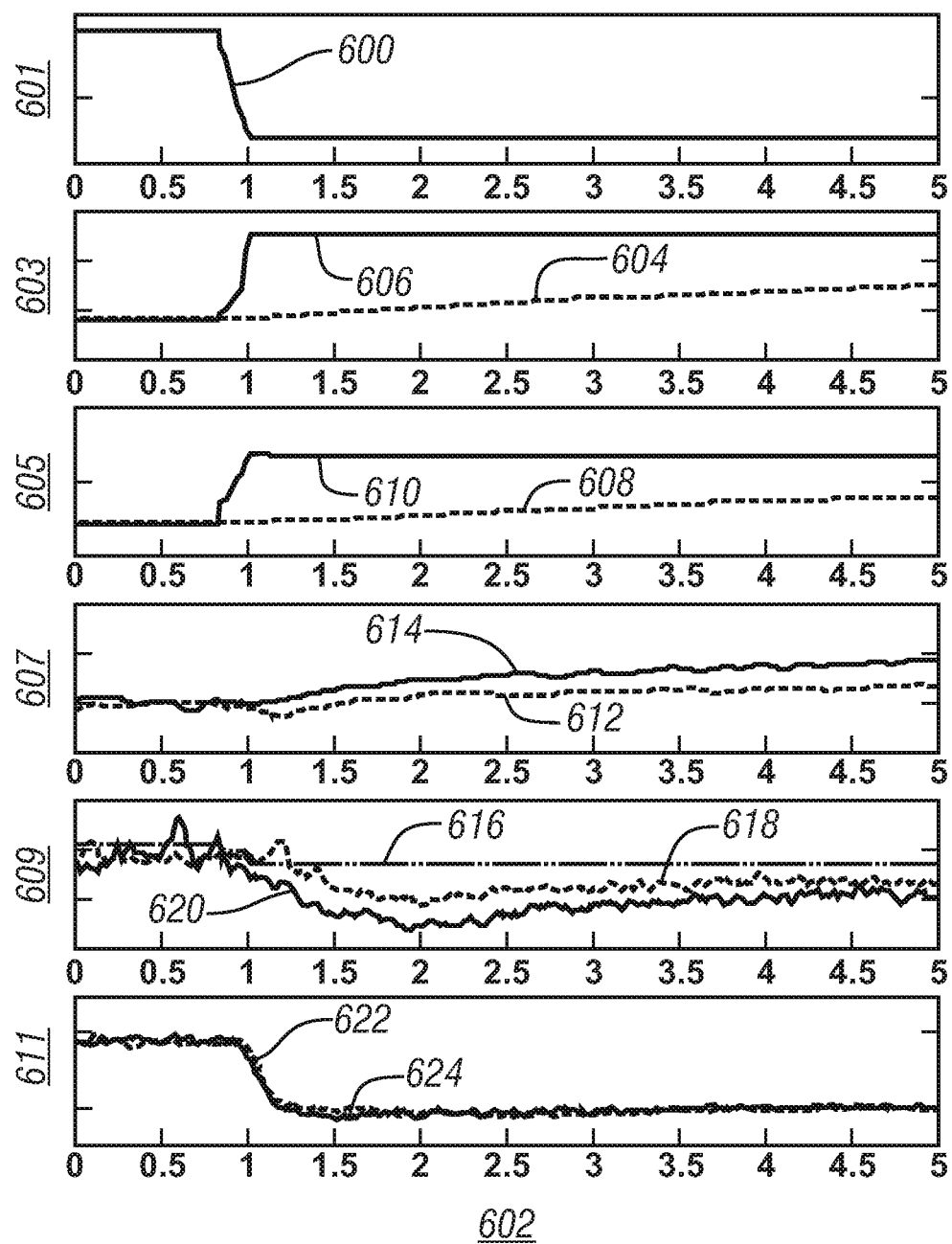
FIG. 6 graphically depicts experimental and derived data from an exemplary engine, depicting fuel injected mass 601, fuel injection timing 603, spark ignition timing 605, EGR valve opening 607, CA50 (i.e., crank angle location of 50% fuel mass burn) 609 and average IMEP 611 versus time 602, in accordance with the present disclosure.

Referring now to FIG. 6, experimental and derived data from an exemplary engine are illustrated, depicting injected fuel mass 601, fuel injection timing 603 (before TDC), spark ignition timing 605 (before TDC), EGR valve opening 607, CA50 (i.e., crank angle location of 50% fuel mass burn) 609, and average IMEP 611 versus time 602 in accordance with the present disclosure. In each of the data plots 603, 605, 607, 609 and 611, the dashed profile lines include adjustments to compensate for slow external EGR dynamics, whereas the solid profile lines do not include adjustments to compensate for slow external EGR dynamics. When an injected fuel mass is decreased 600, compensated fuel injection timing 604 is plotted against fuel injection timing 606 without compensation; compensated spark ignition timing 608 is plotted against spark ignition timing 610 without compensation; EGR valve opening 612 with compensation is plotted against EGR valve opening 614 without compensation which is adjusted in real-time to maintain a desired CA 50 profile 616; and compensated IMEP 622 is plotted against IMEP 624 without compensation. It is appreciated that compensated CA 50 profile 618 more closely maintains the desired CA 50 profile 616 when compensation for slow external EGR emptying dynamics is utilized, as opposed to CA 50 profile 620 without compensating for the external EGR emptying dynamics.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a multi-cylinder direct-injection internal combustion engine comprises:
in response to an injected fuel mass transient from a first injected fuel mass to a second injected fuel mass:
establishing an external exhaust gas recirculation valve from a present position to a target position to achieve a target exhaust gas recirculation, the target exhaust gas recirculation corresponding to the second injected fuel mass; and
when a magnitude of the second injected fuel mass is greater than a magnitude of the first injected fuel mass,
decreasing the external exhaust gas recirculation by adjusting the valve from the present position to the target position to achieve the target exhaust gas recirculation, and
decreasing combustion initiation timing at a rate based only upon external exhaust gas recirculation emptying dynamics during the decreased external exhaust gas recirculation, the combustion initiation timing decreased through retarding at least one of fuel injection timing and spark ignition timing at the rate synchronized with the external exhaust gas recirculation emptying dynamics;
when the magnitude of the second injected fuel mass is less than the magnitude of the first injected fuel mass,
increasing the external exhaust gas recirculation by adjusting the valve from the present position to the target position to achieve the target exhaust gas recirculation, and
increasing combustion initiation timing at a rate based only upon external exhaust gas recirculation filling dynamics during the increased external exhaust gas recirculation, the combustion initiation timing increased through advancing at least one of fuel injection timing and spark ignition timing at the rate synchronized with the external exhaust gas recirculation filling dynamics.

2. Method for controlling a multi-cylinder spark-ignition direct-injection internal combustion engine, comprising:
in response to an injected fuel mass transient from a first injected fuel mass to a second injected fuel mass, adjusting an external exhaust gas recirculation from a value corresponding to the first injected fuel mass to a value corresponding to the second injected fuel mass; and
when a magnitude of the second injected fuel mass is greater than a magnitude of the first injected fuel mass, decreasing combustion initiation timing at a rate based only upon external exhaust gas recirculation emptying dynamics during a decrease in the external exhaust gas recirculation to the value corresponding to the second injected fuel mass, wherein the combustion initiation timing is decreased through retarding at least one of fuel injection timing and spark ignition timing at the rate synchronized with the external exhaust gas recirculation emptying dynamics;
when a magnitude of the second injected fuel mass is less than a magnitude of the first injected fuel mass, increasing combustion initiation timing at a rate based only upon external exhaust gas recirculation filling dynamics during an increase in the external exhaust gas recirculation to the value corresponding to the second injected fuel mass, wherein the combustion initiation timing is increased through advancing at least one of fuel injection timing and spark ignition timing at the rate synchronized with the external exhaust gas recirculation filling dynamics.

3. The method of claim 2 wherein the injected fuel mass transient is selected as a transient mass sufficient to achieve an operator torque request; and adjusting the external exhaust gas recirculation comprises adjusting the external exhaust gas recirculation to maintain a stoichiometric air fuel ratio.

4. The method of claim 2 wherein adjusting the external exhaust gas recirculation comprises:
increasing the injected fuel mass to the value corresponding to the second injected fuel mass in response to an increased operator torque request; and
decreasing the external exhaust gas recirculation to achieve the value corresponding to the increased injected fuel mass.

5. The method of claim 4
wherein the external exhaust gas recirculation emptying dynamics initially operate the engine with an excessive external exhaust gas recirculation until the decreased external exhaust gas recirculation achieves the value corresponding to the increased injected fuel mass.

6. The method of claim 5 wherein the retarding at least one of fuel injection timing and spark ignition timing at the rate synchronized with the external exhaust gas recirculation emptying dynamics substantially reduces combustion misfire and combustion partial burns resulting from the initially excessive external exhaust gas recirculation.

7. The method of claim 2 wherein adjusting the external exhaust gas recirculation comprises:
decreasing the injected fuel mass to the value corresponding to the second injected fuel mass in response to a decreased operator torque request; and
increasing the external exhaust gas recirculation to achieve a value corresponding to the decreased injected fuel mass.

8. The method of claim 7 wherein
the external exhaust gas recirculation filling dynamics initially operate the engine with an insufficient external exhaust gas recirculation until the increased external exhaust gas recirculation achieves the value corresponding to the decreased injected fuel mass.

9. The method of claim 8 wherein the advancing at least one of fuel injection timing and spark ignition timing at the rate synchronized with the external exhaust gas recirculation filling dynamics substantially reduces combustion phasing to substantially reduce excessive combustion noise resulting from the initially insufficient external exhaust gas recirculation.

10. The method of claim 2, wherein the multi-cylinder spark-ignition direction-injection internal combustion engine is operating in a high-load homogeneous charge compression ignition mode including spark-assisted ignition, the spark-assisted ignition comprising:
delivering the injected fuel mass to the engine using a single injection during an intake stroke;
spark-igniting the injected fuel mass subsequent to the single injection during a compression stroke initiating flame propagation; and auto-igniting the remainder of the injected fuel mass when temperature of the compressed injected fuel mass increases by the flame propagation to a temperature sufficient for auto-ignition.

11. The method of claim 10 wherein spark igniting the injected fuel mass retards auto-ignition to extend the high-load operating limit of controlled auto-ignition combustion, wherein retarding the spark timing reduces excessive combustion noise and advancing the spark timing reduces combustion misfire and partial burns.

12. Method for controlling a multi-cylinder spark-ignition direct-injection internal combustion engine comprises:
    operating the engine in a spark-assisted a homogeneous charge compression ignition mode;
    monitoring a torque request;
    in response to a load transient from a first load to a second load corresponding to a transient torque request, adjusting an external exhaust gas recirculation to achieve a value corresponding to the second load to maintain a substantially stoichiometric combustion; and
    when a magnitude of the second load is greater than a magnitude of the first load, decreasing combustion initiation timing at a rate based only upon external exhaust gas recirculation emptying dynamics during a decrease in the external exhaust gas recirculation to the value corresponding to the second load, wherein the combustion initiation timing is decreased through retarding at least one of fuel injection timing and spark ignition timing at the rate synchronized with the external exhaust gas recirculation emptying dynamics;
    when a magnitude of the second load is less than a magnitude of the first load, increasing combustion initiation timing at a rate based only upon external exhaust gas recirculation filling dynamics during an increase in the external exhaust gas recirculation to the value corresponding to the second load, wherein the combustion initiation timing is increased through advancing at least one of fuel injection timing and spark ignition timing at the rate synchronized with the external exhaust gas recirculation filling dynamics.

13. The method of claim 12 wherein decreasing the combustion initiation timing at the rate based only upon external exhaust gas recirculation emptying dynamics during the decrease in the external exhaust gas recirculation to the value corresponding to the second load comprises:
    initiating an auto-ignition timing based upon the increased second engine load comprising utilizing the retarded spark ignition timing selected to combust a portion of an air fuel charge, wherein the retarded spark ignition timing compensates for an initially excessive external exhaust gas recirculation resulting from the emptying dynamics until the decreased external exhaust gas recirculation achieves the value corresponding to the increased second load.

14. The method of claim 13 further comprising:
    the retarded injected fuel mass timing compensates for an initially excessive external exhaust gas recirculation resulting from the emptying dynamics until the decreased external exhaust gas recirculation achieves the value corresponding to the increased second load.

15. The method of claim 12 wherein increasing the combustion initiation timing at the rate based only upon external exhaust gas recirculation filling dynamics during the increase in the external exhaust gas recirculation to the value corresponding to the second load:
    initiating an auto-ignition timing based upon the decreased second engine load comprising utilizing the advanced spark ignition timing selected to combust a portion of an air fuel charge to initiate the predicted auto-ignition timing, wherein the advanced spark ignition timing compensates for an initially insufficient external exhaust gas recirculation resulting from the filling dynamics until the increased external exhaust gas recirculation achieves the value corresponding to the decreased second load.

16. The method of claim 15 further comprising:
    the advanced injected fuel mass timing compensates for an initially insufficient external exhaust gas recirculation resulting from the filling dynamics until the increased external exhaust gas recirculation achieves the value corresponding to the decreased second load.

* * * * *